March 21, 1944. W. C. TUCKER 2,344,907
WORK-HOLDING MEANS FOR CUTTING MACHINES AND THE LIKE
Filed July 14, 1943 2 Sheets-Sheet 1

INVENTOR
William C. Tucker,
BY
Parker, Prochnow Farmer
ATTORNEYS

March 21, 1944. W. C. TUCKER 2,344,907
WORK-HOLDING MEANS FOR CUTTING MACHINES AND THE LIKE
Filed July 14, 1943 2 Sheets-Sheet 2
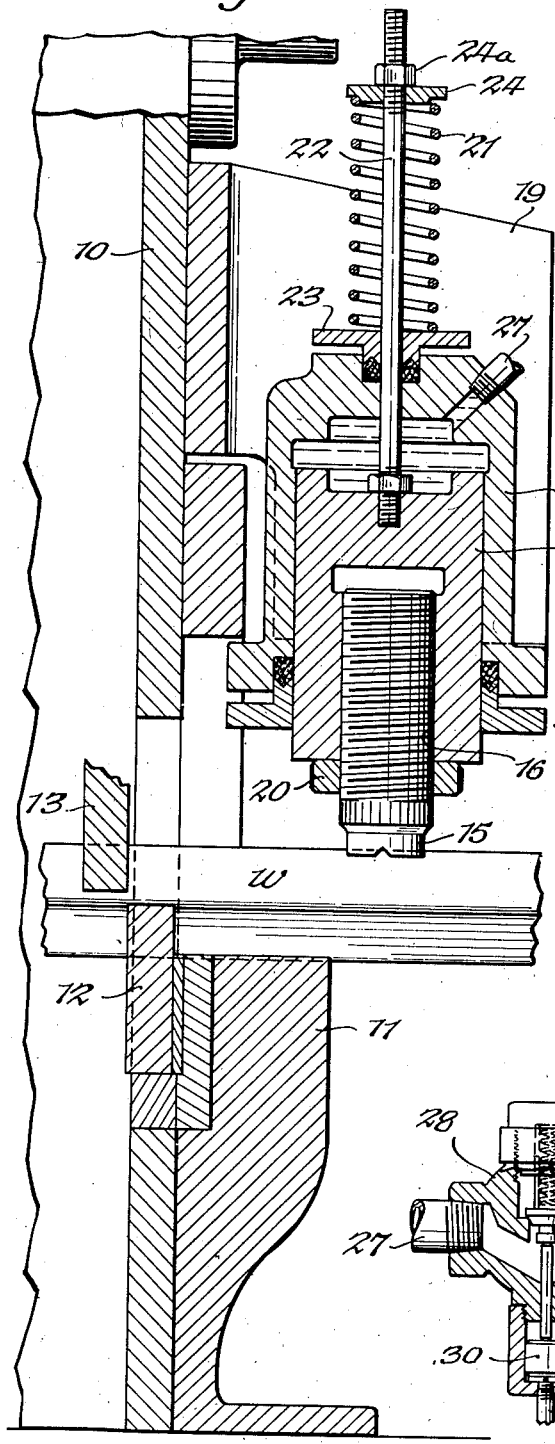
Fig. 2.
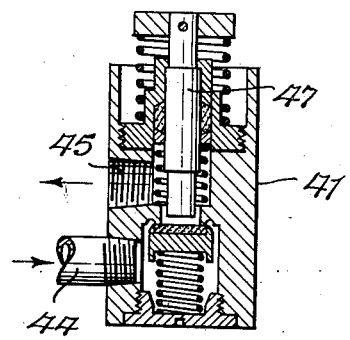
Fig. 3.
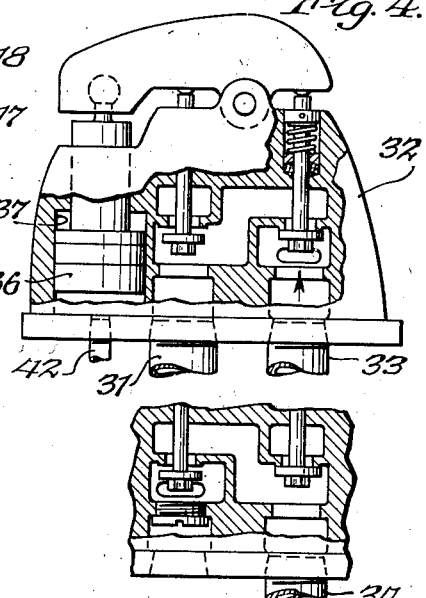
Fig. 4.
Fig. 5.
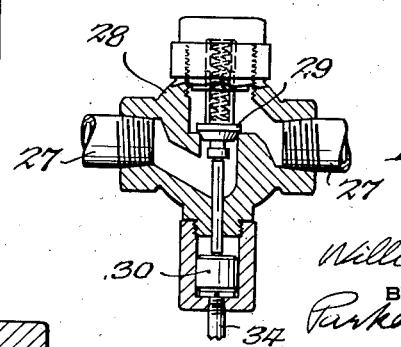
Fig. 6.
INVENTOR
William C. Tucker
BY Parker, Prochnow & Farmer
ATTORNEYS Patented Mar. 21, 1944

2,344,907

UNITED STATES PATENT OFFICE 2,344,907

WORK-HOLDING MEANS FOR CUTTING MACHINES AND THE LIKE

William C. Tucker, Kenmore, N. Y., assignor to Buffalo Forge Company, Buffalo, N. Y.

Application July 14, 1943, Serial No. 494,671

12 Claims. (Cl. 164—52)

This invention relates to shearing or cutting machines such, for example, as billet or bar cutting machines which are equipped with holddown or clamping means for holding the bar or work firmly in place during the cutting operation and for releasing the bar or work to permit it to be advanced for successive cuts. More particularly, the invention relates to improvements in the holddown or work-holding means of machines of such character, and has for one of its objects to provide an efficient, desirable and practical work holddown or clamping means of improved construction.

Other objects of the invention are to provide a work-holding or clamping mechanism in which the work-holding element is directly actuated by an hydraulic pressure device which is operated by pneumatic or fluid pressure-actuated mechanism whereby the work will be rigidly held under a very strong unyielding pressure while nevertheless the mechanism can be operated by compressed air which is usually available in plants and machine shops; which is of simple construction and involves the minimum of mechanical working parts or instrumentalities; and in which the hydraulic actuating means for the work holder includes a check device that automatically maintains the work-holding pressure on the work holder until the check device is actuated to permit work-releasing movement of the work holder.

Further objects and advantages of the invention will appear from the following specification of the preferred embodiment of the invention, shown in the accompanying drawings, and the novel features of the invention are set forth in the appended claims.

In said drawings:

Fig. 2 is a fragmentary, longitudinal, sectional elevation of the machine omitting the pneumatic operating mechanism for the hydraulic actuating device for the work holder.

Fig. 3 is a sectional elevation of the relief valve of the operating mechanism.

Fig. 4 is an elevation, partly in vertical section, of the control valve of the operating mechanism.

Fig. 5 is a vertical section of the same valve on a different plane parallel to the plane of the section of Fig. 4.

Fig. 6 is a sectional elevation of the check valve of the hydraulic holder-actuating means.

Figure 1:
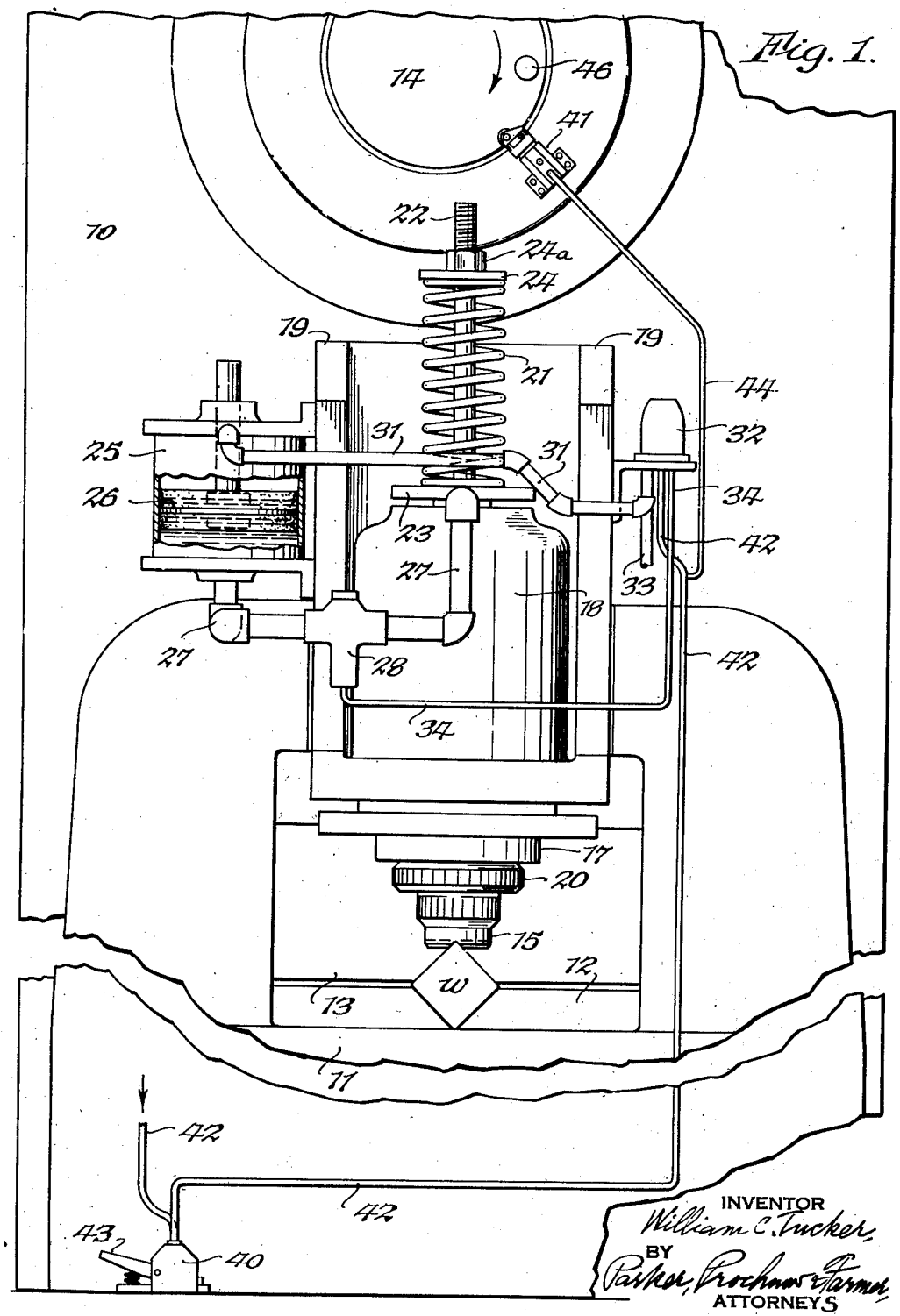
Fig. 1 is a fragmentary, front elevation, partly in section, of a billet or bar-shearing machine equipped with work-holding means embodying my invention.

Since the present invention is directed to the work-clamping or holding means of the machine and is applicable to shearing, cutting or other machines, and is not concerned with the construction of the machine itself, the machine may be of any usual or known construction, and the drawings merely illustrate the cutting machine sufficiently to disclose the application of the work-holding or clamping mechanism thereto. As illustrated in the drawings, the machine comprises an upright frame 10 having a bed or work support 11 on which the bar or work W rests and is supported while being cut, a lower or stationary cutter or blade 12, which is rigidly secured on the machine frame, and an upper or reciprocable cutter or blade 13 which is suitably guided to move toward and from the stationary blade and may be reciprocated, as by the usual eccentric, on a rotary driven shaft 14. The machine may be provided with the usual additional supporting means, such as stationarily mounted rollers arranged in front of the bed or support 11 and cooperating therewith to form an extended horizontal support for the bars to be cut, but such additional supporting means are not shown in the drawings.

15 represents the work-holder, holddown or clamping element which is arranged to move toward and from and to be pressed against the bar or work W to hold the same rigidly in place on the bed against tipping or displacement under the leverage exerted on the bar by the pressure of the movable cutter thereon during the cutting operation. Preferably, this work-holder 15 is in the form of a cylindrical steel block having a hardened lower end suitably shaped to properly engage the bar or work, and a screw threaded shank which is screwed into a threaded bore 16 in the piston or movable member 17 of a hydraulic pressure device which, as shown, comprises said piston arranged to reciprocate in a cylinder 18 which may be stationarily mounted in any suitable manner, as for instance, by means of a supporting bracket 19 rigidly welded on the machine frame 10. The holder 15 can thus be adjusted inwardly or outwardly in the piston as may be required, by turning it in one or the other direction in the threaded piston bore to adapt it for holding bars or work of different thicknesses, and the holder can be secured in the adjusted position, as by means of a lock nut 20 on the threaded shank of the holder and adapted to be tightened against the lower end of the piston 17.

The work-holder 15 is moved to and forcibly pressed against the work for holding it, by an incompressible liquid, preferably oil, forced under pressure into the hydraulic cylinder 18 above the piston, and the piston may be lifted or moved to release the work for permitting the latter to be removed from the machine or advanced for a successive cut by suitable means, such as a spring 21. This spring, as shown, surrounds a rod 22 secured to the piston and projecting out of the upper end of the cylinder 18, said spring bearing at one end against the packing gland 23 of a stuffing box for the piston rod, and at its other end against an abutment, such as a nut 24 screwed on the threaded upper end of the piston rod, so as to be adjustable for regulating the compression of the spring. The adjusting nut may be secured in adjusted positions by a lock nut 24a adapted to be tightened against the adjusting nut. When liquid under pressure is admitted to the hydraulic cylinder, the piston and work holder 15 are forced downwardly, or toward the work, and when the liquid pressure on the piston is released, the spring acts to lift or move the piston and holder to release the work.

Liquid is forced into the hydraulic cylinder 18 for moving the piston and holder to the work by a pump, which as shown, comprises a stationarily mounted cylinder 25 and a piston 26 movable therein. The lower end of the pump cylinder is connected by piping 27 to the upper end of the hydraulic cylinder. The piston of the pump is actuated, preferably by compressed air admitted to the upper end of the pump cylinder for forcing the liquid from the pump cylinder into the hydraulic cylinder. Connected in the piping 27 is a check valve 28, the movable element 29 of which (see Fig. 6), is arranged to open to permit free passage of the liquid from the pump to the hydraulic cylinder and to be closed against its seat by a suitable spring and back pressure of the liquid to prevent reverse flow of the liquid. This valve thus maintains an unyielding work-holding pressure on the hydraulic piston and work holder except when the check valve element 29 is opened by operating, as later explained, a pilot actuating device 30 associated with the check valve.

The liquid pump is operated by compressed air or pneumatic pressure admitted to and exhausted from the pump cylinder 25 above its piston 26 through a pipe 31 by means of a pilot-actuated control valve 32 which may be of any suitable construction, the valve shown being a 4-way valve of the known type shown in Patent #1,486,304, issued March 11, 1924, to Charles A. Ross. Control valve 32 is adapted to admit compressed air to pipe 31 leading to the pump cylinder 25 from an air supply pipe 33 which is connected with any suitable source of supply of air under pressure, and the valve is also adapted to deliver the compressed air by a pipe 34 to the pilot actuating device 30 of the check valve 28. As stated, control valve 32 is of known construction, and it is sufficient to say that this valve is equipped with an actuating pilot device comprising, as shown, a piston 36 working in a cylinder 37 for opening the four spring seated movable elements of the valve, which is designed so that when the pilot piston is operated by admission of compressed air to the cylinder 37, control valve 32 connects the compressed air supply pipe 33 with the pipe 31 leading to the pump cylinder 25 and causes the pump piston to force liquid to the hydraulic cylinder 18, and at the same time control valve connects pipe 34 leading from the pilot actuating device 30 of check valve 28 with an exhaust port or connection, thereby leaving the check valve 28 free to act normally to pass liquid from the pump into the hydraulic cylinder and prevent back flow of the liquid from the hydraulic cylinder; whereas, when the air pressure on its actuating pilot piston 36 is released, the control valve 32 will connect pipe 31 from the pump cylinder with the exhaust port or connection to permit return or upward movement of the pump piston, and at the same time will connect air supply pipe 33 with pipe 34 leading to the pilot actuating device 30 of check valve 28, whereby the piston in the cylinder of this device will be moved to unseat or open the check valve element 29 and so permit the return of the liquid past the check valve from the hydraulic cylinder 18 into the pump cylinder 25 to thus cause the hydraulic piston 17 and work holder 15 to be lifted or moved by their spring 21, to release the work.

For thus operating the control valve 32 to effect the work-holding and work-releasing movements of the hydraulic piston 17 and work holder 15, an operating air pressure supply valve 40 and an air pressure relief or exhaust valve 41 are shown. The supply valve 40, as illustrated, is a manual treadle-operated valve, controlling an air pressure supply line 42 leading from the source of compressed air to the cylinder 37 of the pilot-actuating device of control valve 32. By depressing the actuating treadle 43 of valve 40, this valve is opened and admits compressed air from the supply line 42 to the pilot cylinder 37, thus operating control valve as explained, to cause the pump to force liquid to the hydraulic cylinder and actuate the hydraulic piston and holder 15 to hold the work. The work will be rigidly held or clamped by the holder until the air pressure on the pilot-actuating piston 36 of control valve 32 is released, preferably, as herein disclosed, by the relief valve 41, which is connected to a branch 44 of the air supply line 42. Relief valve 41, which may be of the known construction disclosed in Fig. 3, having a spring-seated movable element which normally prevents escape of the air through its exhaust port 45, is arranged to be automatically opened to allow escape of the air from pipe line 42 and therefore from the pilot actuating device of control valve 32, by a moving part of the shearing machine, such as a tappet pin 46 on the eccentric shaft 14 of the machine and disposed so as to actuate plunger 47 of relief valve 41 to open the valve and exhaust the air when the machine has completed a cut. This releases the work so that it can be removed or advanced for another cut.

While, as herein disclosed, the work-holding mechanism is operated to engage and hold the work by the manual operation of valve 40, and to release the work automatically by the relief valve 41 when the cut is completed, manifestly any suitable or desired means for actuating the valves may be provided.

I claim as my invention:

1. In a work holding mechanism for shearing machines and the like, comprising a holder movable to hold and release the work, the improved construction comprising an hydraulic pressure-actuated operating device for said holder, pneumatic pressure-actuated means for delivering liquid under pressure to and releasing it from said hydraulic operating device for moving said holder to hold and release the work, check means which normally prevents release of liquid from said hydraulic device to thereby maintain holding-pressure on said holder, and pneumatically operated means for actuating said check means to release liquid from said hydraulic means and effect work-releasing movement of said holder.

2. In a work holding mechanism for shearing machines and the like, comprising a holder movable to hold and release the work, the improved construction comprising an hydraulic pressure-actuated operating device for said holder, a pump for forcing liquid to said hydraulic device for moving the holder to hold the work, a check valve arranged and operating to allow delivery of liquid from the pump to said hydraulic device and prevent return flow of liquid to the pump to thereby maintain pressure of the holder on the work, and control means constructed and arranged to operate said pump and check valve to effect return flow of the liquid from said hydraulic device to the pump and work releasing movement of the holder.

3. In a work holding mechanism for shearing machines and the like, comprising a holder movable to hold and release the work, the improved construction comprising an hydraulic pressure-actuated operating device for said holder, a pneumatic pressure-actuated pump for forcing liquid to said hydraulic device for moving the holder to hold the work, a check valve arranged and operating to allow delivery of liquid from the pump to said hydraulic device and prevent return flow of liquid to the pump to thereby maintain pressure of the holder on the work, and control means constructed and arranged to operate said pump and check valve to effect return flow of the liquid from said hydraulic device to the pump and work releasing movement of the holder.

4. In a work holding mechanism for shearing machines and the like, comprising a holder movable to hold and release the work, the improved construction comprising an hydraulic pressure-actuated operating device for said holder, a pneumatic pressure-actuated pump for forcing liquid to and relieving pressure in said hydraulic device for effecting work holding and releasing movements of said hydraulic device and holder, means for normally checking withdrawal of the liquid from the hydraulic device to thereby maintain work-holding pressure on said holder, and control means for operating said pump and checking means to return liquid from said hydraulic device to said pump and effect work-releasing movement of said holder.

5. In a work holding mechanism for shearing machines and the like, comprising a holder movable to hold and release the work, the improved construction comprising an hydraulic pressure-actuated operating device for said holder, a pneumatic pressure-actuated pump for forcing liquid to and relieving pressure in said hydraulic device for effecting work holding and releasing movements of said hydraulic device and holder, a check valve which normally allows flow of liquid from said pump to said hydraulic device and prevents return flow of liquid to the pump to thereby effect work holding action of said holder, and means for operating said pump and check valve to return liquid from said hydraulic device to said pump for effecting work releasing movement of the holder.

6. In a work holding mechanism for shearing machines and the like, comprising a holder movable to hold and release the work, the improved construction comprising an hydraulic pressure-actuated operating device for said holder, a pump and connections for forcing liquid under pressure to and relieving pressure in said hydraulic device for effecting work holding and releasing movements of said holder, a check valve in said connections which normally opens to allow flow of liquid to said hydraulic device and closes to prevent return flow of liquid therefrom, pneumatic pressure supply connections and control means for operating said pump, and means controlled by said control means for opening said check valve when said pump is actuated to withdraw liquid from said hydraulic device.

7. In a work holding mechanism for shearing machines and the like, comprising a holder movable to hold and release the work, the improved construction comprising an hydraulic pressure-actuated operating device for said holder, a pump and connections for forcing liquid under pressure to and relieving pressure in said hydraulic device for effecting work holding and releasing movements of said holder, a check valve in said connections which normally opens to allow flow of liquid to said hydraulic device and closes to prevent return flow of liquid therefrom, a pilot device for opening said check valve, pneumatic pressure supply and exhaust connections for said pump and pilot device, and a control valve in said connections constructed and arranged to deliver pneumatic pressure to said pump and exhaust it from said pilot device for effecting work holding movement of said hydraulic device and holder, and to exhaust pneumatic pressure from said pump and deliver it to said pilot device for operating the pump and opening said check valve to effect work releasing movement of said hydraulic device and holder.

8. In a work holding mechanism for shearing machines and the like, comprising a holder movable to hold and release the work, the improved construction comprising an hydraulic pressure-actuated operating device for said holder, a pump and connections for forcing liquid under pressure to and relieving pressure in said hydraulic device for effecting work holding and releasing movements of said holder, a check valve in said connections which normally admits liquid to said hydraulic device and prevents back flow of the liquid to thereby maintain work holding pressure on said holder, a fluid pressure-actuated device for opening said check valve, and fluid pressure control means constructed and arranged to operate said pump and check valve opening device to effect work-holding and work-releasing movements of said hydraulic device and holder.

9. In a work holding mechanism for shearing machines and the like, comprising a holder movable to hold and release the work, the improved construction comprising an hydraulic operating device for said holder, a pump and connections for forcing liquid under pressure to and relieving pressure in said hydraulic device for effecting work holding and releasing movements of said holder, a check valve in said connections which normally opens to allow flow of liquid to said hydraulic device and closes to prevent back flow of the liquid, a fluid pressure-actuated device for opening said check valve, a fluid pressure control valve and connections for said pump and said valve opening device, means for operating said control valve to deliver fluid pressure to said pump and exhaust it from said check valve opening device to effect work holding movement of said hydraulic device and holder, and means for operating said control valve to exhaust fluid pressure from said pump and deliver it to said check valve opening device to effect work releasing movement of said hydraulic device and holder.

10. The improved work holding mechanism substantially as set forth in claim 9, in which manually actuated means is provided to effect work holding movement of said holder, and means controlled by the machine is provided for operating said control valve to effect work releasing movement of said holder.

11. In a work holding mechanism for shearing machines and the like comprising a holder movable to hold and release the work, the improved construction comprising a stationary hydraulic cylinder, a piston movable in said cylinder and carrying said holder, a pump and connections for forcing liquid under pressure to and relieving pressure in said cylinder, a check valve in said connections which normally admits liquid to said cylinder and prevents back flow of the liquid, a pressure actuated device for opening said check valve, and means constructed and arranged to deliver fluid pressure to said pump and exhaust it from said check valve opening device to effect work holding movement of said piston and holder, and to exhaust fluid pressure from said pump and deliver it to said check valve opening device to effect work releasing movement of said piston and holder.

12. In a work holding mechanism for shearing machines and the like comprising a holder movable to hold and release the work, the improved construction comprising a stationary hydraulic cylinder, a piston movable in said cylinder and carrying said holder, spring means for moving said piston and holder to release the work, a pump and connections for forcing liquid under pressure to and relieving pressure in said cylinder to effect work holding and work releasing action of said piston and holder, a check valve in said connections which normally admits liquid to said cylinder and prevents back flow of the liquid, a pressure actuated device for opening said check valve, and fluid pressure control means constructed and arranged to operate said pump and check valve operating device.

WILLIAM C. TUCKER.